United States Patent [19]

Eilers et al.

[11] 4,405,944
[45] Sep. 20, 1983

[54] TV SOUND TRANSMISSION SYSTEM

[75] Inventors: Carl G. Eilers, River Forest; Pieter Fockens, Glenview, both of Ill.

[73] Assignee: Zenith Radio Corporation, Glenview, Ill.

[21] Appl. No.: 357,520

[22] Filed: Mar. 12, 1982

Related U.S. Application Data

[63] Continuation-in-part of Ser. No. 196,491, Oct. 14, 1980, Pat. No. 4,339,772.

[51] Int. Cl.³ .......................... H04N 5/40; H04N 5/44
[52] U.S. Cl. .................................................. 358/144
[58] Field of Search ....................... 358/142, 143, 144

[56] References Cited

U.S. PATENT DOCUMENTS

| | | |
|---|---|---|
| 3,046,329 | 7/1962 | Reesor . |
| 3,221,098 | 11/1965 | Feldman et al. . |
| 3,257,511 | 6/1966 | Adler et al. . |
| 3,388,214 | 6/1968 | Eilers et al. . |
| 4,048,654 | 9/1977 | Wegner . |
| 4,139,866 | 2/1979 | Wegner ............................ 358/198 |

OTHER PUBLICATIONS

Vol. 89, Jul., 1980 SMPTE Journal, pp. 513–519.
IEEE Transactions vol. BIR 11-3, pp. 17–22, Dec., 1965.

*Primary Examiner*—Michael A. Masinick

[57] ABSTRACT

A television signal audio transmission system comprises transmission means for developing first and second stereophonically related audio signals and means for developing a third audio signal. The transmission means further includes circuitry for developing a composite baseband signal having a first component comprising the sum of the first and second audio signals, a second component comprising a double sideband suppressed carrier signal formed by amplitude modulating a $2f_H$ subcarrier with the difference between the first and second audio signals, a third component comprising a pilot signal having a frequency $f_H$ and a fourth component comprising a $4f_H$ subcarrier signal frequency modulated according to the third audio signal, where $f_H$ represents the horizontal scanning line frequency. The composite baseband signal may include a fifth component comprising an approximately $5.5f_H$ subcarrier signal frequency modulated in accordance with a first information signal and a sixth component comprising an approximately $6.5f_H$ subcarrier signal frequency modulated in accordance with a second information signal. In an alternate embodiment, the fourth and fifth components are replaced by a $5f_H$ subcarrier signal frequency modulated according to the third audio signal. The composite baseband signal is used to frequency modulate a transmitted main audio RF carrier, the transmitted signal being detected by receiving circuits for reproducing the stereophonic audio signals, the third audio signal and the first and second information signals.

22 Claims, 12 Drawing Figures

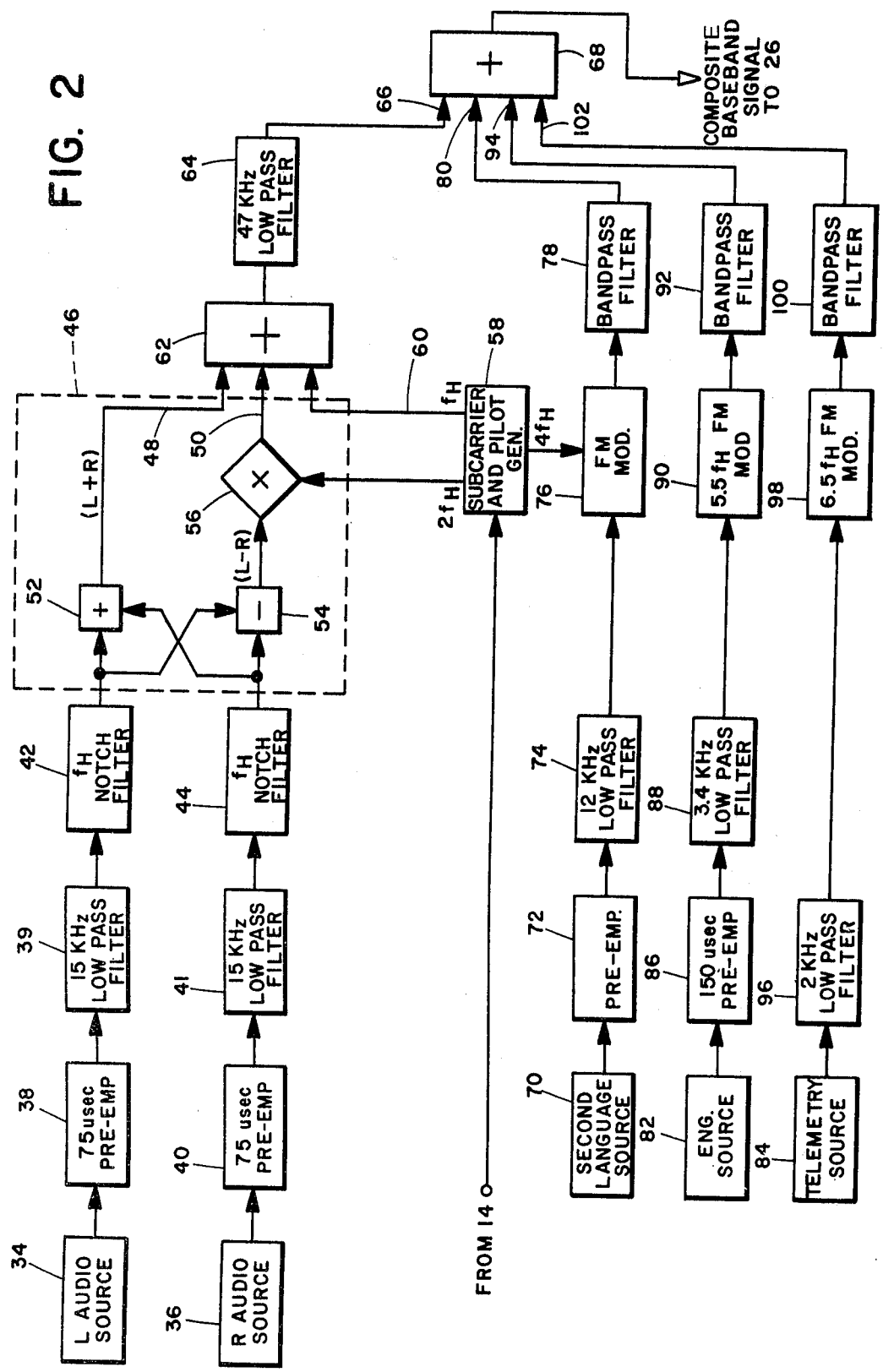

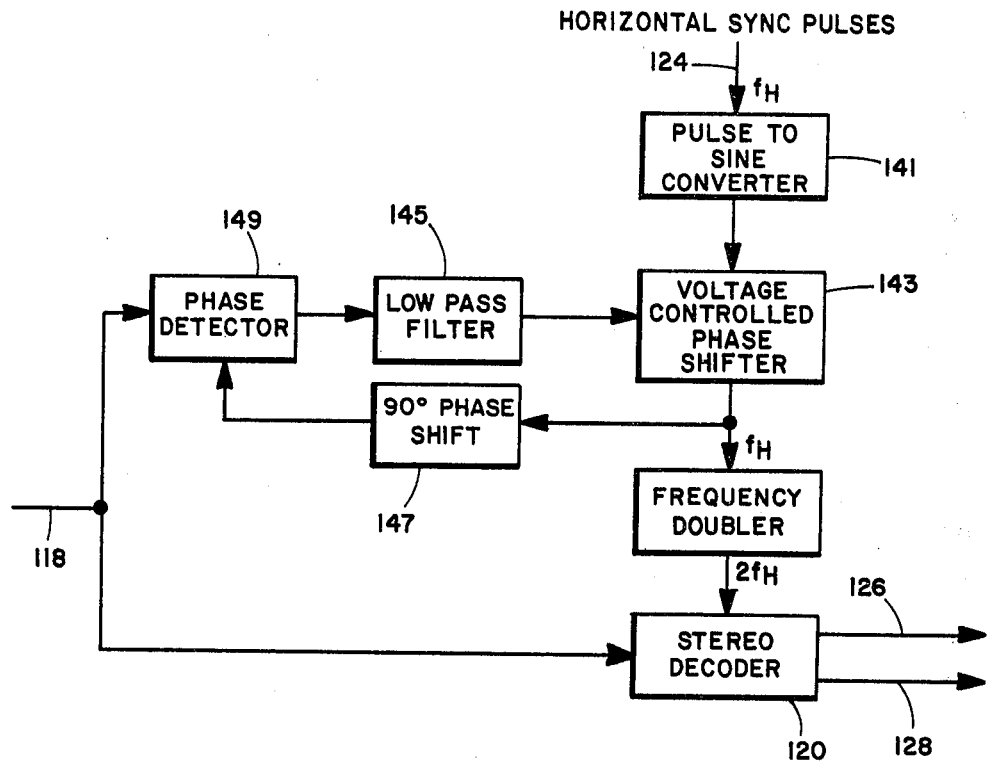
Fig. 5
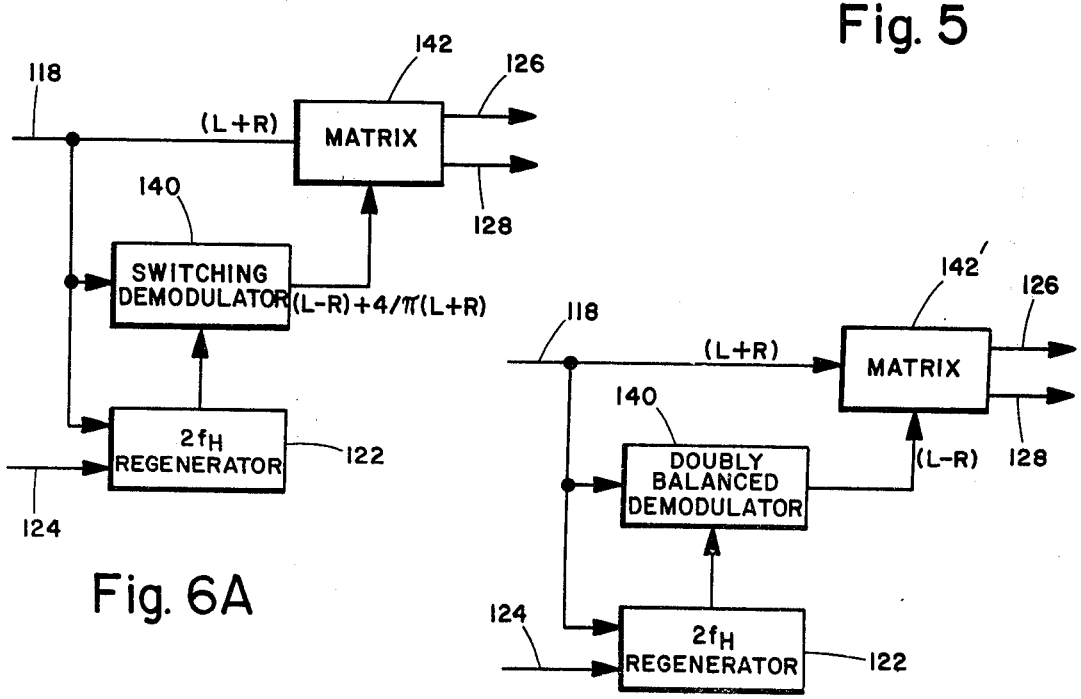
Fig. 6A
Fig. 6B

TV SOUND TRANSMISSION SYSTEM

CROSS REFERENCE TO RELATED APPLICATION

This is a continuation-in-part of co-pending application Ser. No. 196,491, filed Oct. 14, 1980 now U.S. Pat. No. 4,339,772. This application contains new matter primarily in the Abstract, in FIGS. 10 and 11 of the drawings.

BACKGROUND OF THE INVENTION

The present invention relates generally to a new and improved television audio transmission system and is particularly directed to apparatus and methods for transmitting and receiving an audio signal which is compatible with existing television audio receiving circuits and which comprises a series of components, including stereophonic components, efficiently utilizing the audio bandwidth of a broadcast television channel.

Under present television broadcasting standards, a band of frequencies approximately 80 KHz wide is designated within each 6 MHz television channel for the transmission of the audio component of a television signal. Within this band of frequencies, an RF main audio carrier signal is frequency modulated by an audio baseband signal for producing a monaural audio transmission signal. The transmitted monaural audio signal is received by a television receiver which converts the RF audio carrier signal to a signal having a frequency centered at 4.5 MHz. The converted 4.5 MHz sound carrier is then processed by an FM detector to reproduce the monaural audio signal which was used to frequency modulate the RF audio carrier at the transmitter. In this regard, it has been recognized that the audio bandwidth of a television channel has heretofore been largely underutilized whereby the opportunity to transmit a substantial amount of information in addition to the conventional monaural signal over this frequency band has not been taken advantage of. It is accordingly a basic object of the present invention to provide a system more fully exercising the audio bandwidth of a conventional television channel and which is compatible with present-day television receivers. More particularly, it is an object of the present invention to provide apparatus for transmitting and receiving information over the audio bandwidth of a television channel which information includes stereophonic sound components as well as a number of additional audio information components.

The transmission of stereophonic audio signals has been popular in radio broadcasting for some time, the basic FCC approved system being disclosed in U.S. Pat. No. 3,257,511 to R. Adler et al. In this system, the arithmetic sum of left (L) and right (R) audio source signals (L+R), commonly referred to as the main channel modulation, is used to directly frequency modulate the RF carrier signal. The difference between the left and right stereophonically related signals (L−R) is used to amplitude modulate a 38 KHz subcarrier signal in a suppressed carrier fashion with the resultant double-sideband signal being impressed as frequency modulation on the radiated RF carrier. In addition, a pilot subcarrier signal of 19 KHz is transmitted for synchronization of the FM receiver. The FM receiver extracts the 19 KHz pilot subcarrier, doubles its frequency, and applies the resulting 38 KHz signal to a synchronous detector where the (L−R) difference signal is recovered from the amplitude modulated 38 KHz stereophonic subcarrier. The recovered (L−R) modulation is then suitably matrixed with the (L+R) main channel modulation in order to recover the original left and right stereophonic signals.

The foregoing stereophonic radio broadcasting system often also includes an SCA component which allows broadcasters to provide a subscription background music service. The SCA component comprises a 67 KHz subcarrier frequency modulated by the background channel program, the frequency modulated subcarrier being used to frequency modulate the main RF carrier signal together with the stereophonic modulation.

Various systems and apparatus have been proposed for the transmission of stereophonic sound together with a conventional television picture transmission. These systems normally utilize the radio broadcasting stereophonic transmission techniques discussed above but with, in most cases, different subcarrier frequencies selected for their compatibility with the transmitted video signal. One such prior art system is disclosed in U.S. Pat. No. 4,048,654 to Wegner. This patent discloses a transmission system in which a composite baseband signal identical to that employed in FM stereophonic radio broadcasting is employed to frequency modulate the main sound carrier of a television transmission signal. Thus, the proposed composite baseband signal includes an (L+R) main channel component, an amplitude modulated double-sideband suppressed-carrier 38 KHz subcarrier (L−R) component and a 19 KHz pilot component. In another embodiment, the use of a subcarrier signal having a frequency equal to 5/4 of the horizontal scanning line frequency ($f_H$) characterizing the transmitted video signal is proposed in lieu of the 38 KHz (L−R) channel subcarrier to reduce interference from the video component of the television signal.

Another system, which was proposed in U.S. Pat. No. 3,099,707 to R. B. Dome, also employed the conventional stereophonic radio broadcasting system but with an (L−R) channel subcarrier equal to $1.5f_H$ and a pilot signal equal to $2.5f_H$. These frequencies were selected to minimize the effect of the video components of the television signal appearing in the recovered sidebands of the (L−R) channel signal.

U.S. Pat. No. 3,046,329 to Reesor discloses yet another similar system in which the composite baseband signal used to frequency modulate the main sound carrier includes only the main channel (L+R) component and the upper sidebands of the (L−R) channel signal amplitude modulated on a subcarrier having a frequency of $2f_H$. Other prior art systems for stereophonic television sound transmission have proposed the use of frequency modulated subcarriers for the (L−R) stereo channel typically centered at $2f_H$ although a center frequency of $1.5f_H$ has also been proposed.

As previously mentioned, in addition to transmitting stereophonic sound components on the main aural carrier of a transmitted television signal, it is also desirable to transmit additional information thereby more completely exercising the available audio bandwidth within a television channel. For example, the transmission of a second language audio signal would enable a viewer to selectively operate a television receiver for reproducing the audio signals associated with the transmitted stereophonic information, or alternatively, the audio signals associated with the transmitted second language information. Other examples of such additional information include ENG electronic news gathering) signals and telemetry signals, both of which television broadcasters employ for their own private use. ENG signals are employed to provide a direct communications link between a broadcasters and his station's remote camera crews for real-time news reporting while telemetry signals consist of FCC required remote read-outs from unattended transmitter locations to a control location.

One prior art proposal for providing a second language capability in connection with a transmitted television signal is disclosed in previously mentioned U.S. Pat. No. 4,048,654 to Wegner in which the two channels of a stereophonic-like signal are employed. In particular, the (L+R) main channel signal is used to transmit a first language audio signal and the (L−R) stereo channel signal is used to transmit a second language audio signal. U.S. Pat. No. 3,221,098 to Feldman discloses a transmission system allowing for the simultaneous broadcast of a single television program having up to four or more different language soundtracks by forming a composite baseband signal consisting of four or more different subcarrier signals each amplitude modulated with a different language audio signal, the composite baseband signal being used to frequency modulate the main RF audio carrier. Yet another proposed second language system uses a frequency modulated subcarrier baseband signal centered at $2f_H$ for both stereophonic sound transmission and for second language transmission. A pilot signal, modulated with one of two different frequencies, is used to indicate which service is being broadcast.

The foregoing systems and techniques for transmitting different audio signals in conjunction with a standard television transmission have not been adopted in the U.S. for a number of reasons including, in certain cases, poor performance and, in others, incompatibility with U.S. television transmission standards. The system of the present invention, on the other hand, comprises a audio transmission system which is fully compatible with U.S. television broadcasting standards and is capable of providing high-fidelity stereophonic sound transmissions together with a high quality second language service. The system is further characterized in that ENG and telemetry signals are also conveniently accommodated within the audio bandwidth of a television channel.

BRIEF DESCRIPTION OF THE DRAWINGS

FIG. 2 is a functional block diagram illustrating the preferred embodiment of a composite baseband signal source constructed according to the present invention useful for frequency modulating the main audio RF carrier signal produced by the carrier oscillator of FIG. 1.

FIG. 5 is a functional block diagram illustrating a preferred embodiment of the $2f_H$ subcarrier regenerator shown in FIG. 4.

FIGS. 6A and 6B are functional block diagrams illustrating two alternate embodiments of the stereo decoder of FIG. 4.

DESCRIPTION OF THE PREFERRED EMBODIMENT

Figure 1:
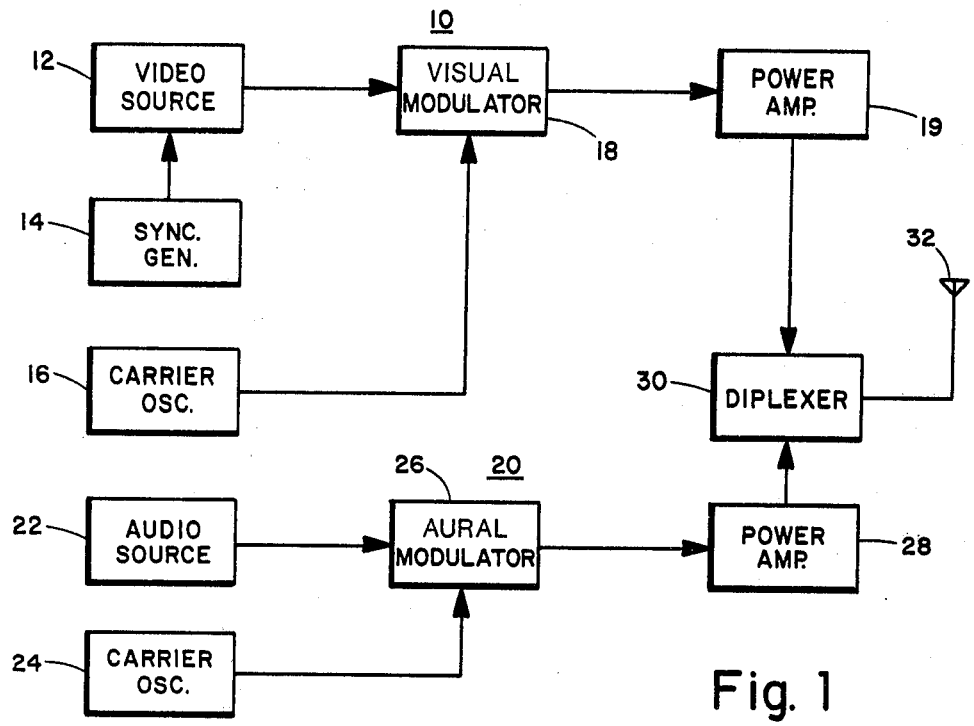
FIG. 1 is a functional block diagram of a television signal transmitter including apparatus for transmitting both the video and audio components of a television signal.

Referring now to the drawings and, in particular, to FIG. 1, a conventional television signal transmitter is shown to comprise a video channel 10 and an audio channel 20. The video channel 10 includes a source of video signals 12, a sync generator 14 connected to the video source 12 and an RF carrier oscillator 16, the oscillator 16 and the video source 12 supplying a video modulator 18. The video modulator 18 develops an output signal comprising a continuous sequence of horizontal scanning lines defined by the sync generator 14, each horizontal scanning line consisting of the RF carrier developed at the output of the carrier oscillator 16 amplitude modulated by the output of the video source 12. According to FCC standards, the horizontal scanning line frequency $f_H$ is approximately 15.75 KHz. The output of the video modulator 18 is amplified by a power amplifier 19 and coupled through a conventional diplexer 30 and transmitted via an antenna 32.

The aural channel 20 of the transmitter shown in FIG. 1 conventionally includes a source of monaural audio signals 22 and an RF carrier oscillator 24 both supplying an audio modulator 26. The output of the audio modulator 26, which consists of the RF carrier developed at the output of the oscillator 24 frequency modulated by the output of the audio source 22, is amplified by a power amplifier 28 and coupled therefrom through the diplexer 30 for transmission via the antenna 32. As discussed previously, the audio source 22 conventionally develops a monaural signal for transmission by the aural channel 20 of the television signal transmitter. As will be explained in detail hereinafter, it is a primary object of the present invention to more completely exercise the aural channel 20 by impressing thereon a stereophonic audio signal together with a corresponding second language audio signal. In addition, the invention further discloses a technique by which an ENG signal and a telemetry signal may also be impressed on the audio channel 20.

FIG. 2 illustrates a portion of the aural channel of a television signal transmitter constructed according to the invention disclosed in the referent co-pending parent application. The circuit illustrated in FIG. 2 which, in terms of the transmitter of FIG. 1, is represented by the audio source 22, develops an output composite baseband signal having a spectrum as graphically represented in FIG. 3. This composite baseband signal is used to frequency modulate the main aural carrier signal developed by the carrier oscillator circuit 24 and is coupled from the aural modulator 26 through the power amplifier 28 and the diplexer 30 for transmission by the antenna 32.

Referring now in detail to FIG. 2, the audio channel is seen to comprise a first audio source 34 and a second audio source 36 for developing a pair of stereophonically related audio signals L (left) and R (right) respectively. Audio sources 34 and 36 may comprise, for example, microphones, pickup circuits of a record player capable of reproducing a stereo recording or any other similar source of stereophonic audio signals. The outputs of the audio sources 34 and 36 are coupled to a pair of 75 microsecond pre-emphasis networks 38 and 40 which, in a well known manner, emphasize the high frequency components of the audio signals relative to the low frequency components thereof so as to achieve certain noise advantages. The outputs of the pre-emphasis networks 38 and 40 are coupled through a pair of 15 KHz low pass filters 39 and 41, respectively, to the inputs of a pair of notch filters 42 and 44. The notch filters 42 and 44 have frequency response characteristics centered at the horizontal scanning line frequency $f_H$ for removing any audio components from the signals L and R near the frequency $f_H$ and couple the filtered and emphasized audio signals to a stereo encoder 46.

The stereo encoder 46, as is well known in the art, may use either time or frequency division multiplexing techniques for developing a main channel audio signal on a first output line 48 and a stereo subchannel signal on a second output line 50. More specifically, the main channel audio signal, which is limited to a bandwidth of 15 KHz by the low pass filters 39 and 41, comprises the arithmetic sum of the left and right stereophonic audio source signals (L+R) and is formed on the output line 48 by an addition process performed by the adder circuit 52. The stereo subchannel signal developed on output line 50 is formed by using the difference between the left and right stereophonic source signals (L−R), this difference signal being developed at the output of a block represented by a subtractor circuit 54, to amplitude modulate a subcarrier signal having a frequency $2f_H$ in a balanced modulator 56 for producing a double sideband suppressed-carrier signal. The $2f_H$ subcarrier signal is coupled to the modulator circuit 56 by a subcarrier and a pilot generator 58 which comprises a phase lock circuit for phase locking the $2f_H$ subcarrier signal to the second harmonic of the television signal horizontal sync pulses developed by the sync generator 14. The use of the $2f_H$ subcarrier for the stereo subchannel signal avoids the production of audible beats with the horizontal scanning line frequency while, at the same time, allowing for a 15 KHz audio bandwidth. The subcarrier and pilot generator 58 also develops a pilot signal on an output line 60 having a frequency $f_H$.

Figure 3:
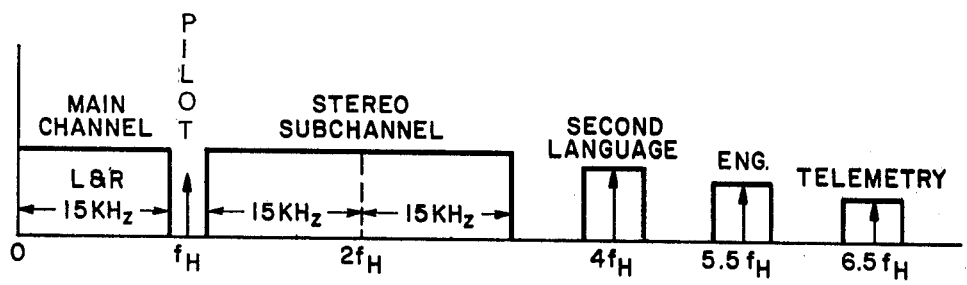
FIG. 3 is a graphic representation of the frequency spectrum of the composite baseband signal developed by the signal source of FIG. 2.

The main channel audio signal developed on line 48, the stereo subchannel signal developed on line 50 and the pilot signal developed on line 60 are all coupled by a summation circuit 62 through a 47 KHz linear phase low pass filter 64 to the first input 66 of a second summation circuit 68, the output of summation circuit 68 corresponding to the output of the audio source 22 of FIG. 1. That is, the composite baseband signal developed at the output of summation circuit 68 is used to frequency modulate the main RF audio carrier in the modulator 26. With reference to FIG. 3, the components of the composite baseband signal coupled to the input 66 of the summation circuit 68 therefore include the 15 KHz bandwidth (L+R) main channel signal, the pilot signal at frequency $f_H$ and the 15 KHz bandwidth upper and lower sidebands of the stereo subchannel signal.

As mentioned above, the composite baseband signal developed at the output of summation circuit 68 is used to frequency modulate the main RF aural carrier signal developed by oscillator 24. While the maximum main aural carrier frequency deviation due to either the main channel signal or the stereo subchannel signal is limited to 25 KHz, in accordance with the well known interleaving phenomenon characteristic of these signals, the total maximum main carrier frequency deviation in response to both signals is limited to a total of 25 KHz. The main carrier frequency deviation due to the pilot signal is 2.5 KHz so that the total main carrier frequency deviation due to the components of the composite baseband signal coupled to the input 66 of summation circuit 68 amounts to 27.5 KHz.

The circuit of FIG. 2 includes a third source of audio signals 70 supplying, for example, a second language audio signal, it being intended that a viewer's television receiver is operable for selectively reproducing either the stereophonic signal described above or the second language audio signal. The second language source 70 is coupled through a pre-emphasis circuit 72 and a 12 KHz low pass filter 74 to one input of an FM modulator 76. The 12 KHz audio bandwidth established by filter 74 is considered sufficient to allow better quality than is needed for the processing of speech-type audio signals alone, such comprising the normal content of the audio signal developed by the source 70 thereby also allowing for the processing of some types of audio music signals. Although not shown in the drawings, this channel may incorporate companding techniques, e.g. of the Dolby or DBX type, to further enhance the reproduction qualities of the second language signal.

The subcarrier and pilot generator 58 couples a subcarrier signal phase locked to $4f_H$ to the second input of the FM modulator 76. As a consequence, the FM modulator 76 develops an output signal consisting of the $4f_H$ subcarrier signal frequency modulated by the second language audio signal. It will be appreciated that centering this signal at a harmonic of the horizontal scanning line frequency $f_H$ effectively inhibits the generation of audible inter-modulation in the reproduction audio signal. The frequency modulated $4f_H$ subcarrier signal is band pass filtered by filter 78 and coupled to the second input 80 of the summation circuit 68. The frequency characteristics of the bandpass filter 78 and the extent of the frequency deviation of the main aural carrier due to the frequency modulated second language audio signal are selected so as to limit the bandwidth of the frequency modulated second language audio signal for preventing interference with adjacent channels. With reference to FIG. 3, the second language audio component of the composite baseband signal developed at the output of the summation circuit 68 is therefore seen to comprise a $4f_H$ subcarrier together with its associated upper and lower FM sidebands extending approximately 12 KHz above and below $4f_H$ respectively.

The circuit of FIG. 2 further includes a source of ENG (electronic news gathering) signals 82 and a source of telemetry signals 84. The ENG signals, which allow a broadcaster to directly communicate with the station's camera crews in the field for real-time news reports and the like, are coupled through a 150 microsecond pre-emphasis circuit 86 to the input of a 3.4 KHz low pass filter 88. The resulting 3.4 KHz bandwidth signal is impressed as a frequency modulation on an approximately $5.5f_H$ subcarrier signal by a second FM modulator 90 and coupled therefrom through a bandpass filter 92 to a third input 94 of the summation circuit 68. The telemetry signals developed by the source 84, which consist of transmissions from unattended transmitter locations, are band limited by a 2 KHz low pass filter 96 and subsequently impressed as frequently modulation on an approximately $6.5f_H$ subcarrier signal by a third FM modulator 98. The frequency modulated $6.5f_H$ subcarrier signal is coupled from the modulator through a bandpass filter 100 to a fourth and final input 102 of the summation circuit 68. The FM modulated ENG and telemetry signals are effective for causing maximum main aural carrier frequency deviations of 4.0 guage signal, the next harmonic of the horizontal scanning line frequency $f_H$ available for use as the second language subcarrier signal if $4f_H$. Allowing for sufficient separation between the upper sidebands of the frequency modulated second language signal and the lower sidebands of the frequency modulated ENG signal, the next available harmonic of the horizontal scanning line frequency $f_H$ is $6f_H$. However, since $6f_H$ is an odd harmonic of the stereo subchannel subcarrier $2f_H$, its use as a subcarrier is not desirable. Consequently, subcarriers for the ENG and telemetry signals are spaced about $0.5f_H$ therefrom at approximately $5.5f_H$ and $6.5f_H$. The main carrier deviations and associated filter bandpass characteristics for these signals are so chosen to prevent interference with adjacent channels. Any resulting beating of the subcarriers with the horizontal scanning line frequency is expected to be minimal.

The foregoing subcarriers together with other pertinent data describing the operation of the circuit of FIG. 2 is presented in tabular form below:

TABLE I

| Modulating Signal | L + R | Pilot | L − R | 2nd language | ENG | Telemetry |
|---|---|---|---|---|---|---|
| Subcarrier Modulation | — | CW | AM DSB-SC | FM | FM | FM |
| Subcarrier Frequency (KHz) | — | $f_H$ | $2 f_H$ | $4 f_H$ | $5.5 f_H$ | $6.5 f_H$ |
| Subcarrier Deviation (KHz) | — | — | — | 8 | 3.5 | 3.0 |
| Max. Subcarrier Modulating Frequency (KHz) | 15 | — | 15 | 12 | 3.4 | 2.0 |
| Pre-emphasis (microseconds) | 75 | — | 75 | 75 | 150 | 0 |
| Main Carrier Deviation (KHz) | 25 | 2.5 | 25 | 15 | 4 | 1.25 | and 1.25 KHz respectively.

Typical stereo demodulators are operative for demodulating a transmitted stereophonic signal at odd harmonics of the stereo subcarrier frequency. As discussed above, the subcarrier signal used to form the stereo subchannel signal in the circuit of FIG. 2 is characterized by a frequency of $2f_H$, the third harmonic of which is equal to $6f_H$. The use of a subcarrier having a frequency of $6f_H$ for either the ENG signals or the telemetry signals would therefore cause interference with the stereo subchannel signal. Accordingly, the subcarriers selected for use with these signals have been displaced about $0.5f_H$ above and below the third harmonic of the stereo subchannel subcarrier signal $2f_H$.

It will thus be seen that the particular four subcarriers selected for use in the circuit of FIG. 2 allow for the most efficient use of the audio bandwidth associated with a transmitted television signal. In particular, referring to FIG. 3, it will be observed that, considering the 15 KHz bandwidth of the main channel (L+R) signal and the 15 KHz bandwidth of the lower sidebands of the stereo subchannel signal, the lowest harmonic of the horizontal scanning line frequency $f_H$ available for use as the stereo subchannel subcarrier is $2f_H$. As mentioned previously, it is desirable to use a harmonic of the horizontal scanning line frequency $f_H$ for this subcarrier in order to prevent the production of audible inter-modulation beats therebetween. Similarly, it is also desirable to use a harmonic of the horizontal scanning line frequency $f_H$ as the subcarrier for the second language audio signal. Considering the 15 KHz bandwidth of the upper sidebands of the stereo subchannel signal and the approximately 12 KHz bandwidth of the second lan- To summarize the foregoing, the composite baseband signal or composite modulation function produced at the output of the summation circuit 68 and impressed as frequency modulation on the main aural RF carrier by modulator 26 comprises a series of distinct components. The initial modulation function component comprises the 15 KHz main channel stereo signal (L+R) while the second component comprises the double-sideband suppressed carrier amplitude modulated stereo subchannel signal. Together these two components account for a frequency deviation of the main aural carrier of 25 KHz. The third modulation function component comprises a pilot signal having a frequency of $f_H$ and accounts for an additional 2.5 KHz of frequency deviation of the frequency modulated main aural carrier. The fourth modulation function component comprises the upper and lower sidebands together with the $4f_H$ subcarrier of the frequency modulated second language audio signal. This FM signal provides another 15 KHz of main carrier frequency deviation. The fifth and sixth modulation function components comprise the upper and lower sidebands and the $5.5f_H$ and $6.5f_H$ subcarriers associated with the ENG and telemetry signals which account for a final contribution of 4.0 and 1.25 KHz respectively to the main carrier frequency deviation. The total main carrier frequency deviation due to the composite baseband signal is therefore 47.75 KHz.

While the foregoing discussion indicates that the $5.5f_H$ and $6.5f_H$ subcarriers are used for transmitting ENG and telemetry signals, this should not be considered as a necessary limitation since these subcarrier signals may be used to transmit various other types of information such as audio signals. In the case where the 5.5$f_H$ and 6.5$f_H$ subcarriers are used to transmit audio signals, the parameters of Table I are preferably modified as follows:

TABLE II

| | 5.5 $f_H$ | 6.5 $f_H$ |
|---|---|---|
| Subcarrier Frequency (KHz) | | |
| Subcarrier Deviation (KHz) | 5.0 | 5.0 |
| Max Subcarrier Modulating Frequency (KHz) | 6.0 | 6.0 |
| Pre-Emphasis (microseconds) | 150 | 150 |
| Main Carrier Deviation (KHz) | 3.0 | 3.0 |

Figure 4:
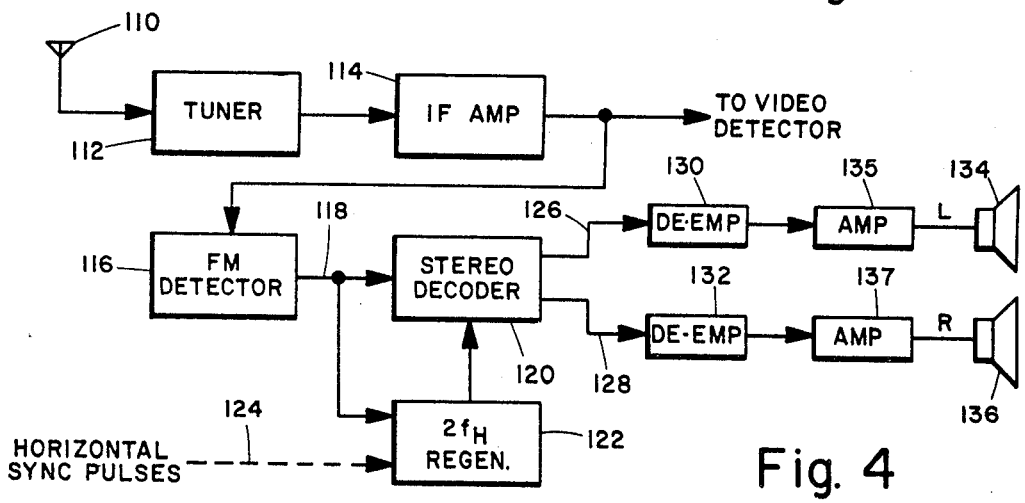
FIG. 4 is a functional block diagram of the portions of a television receiver adapted for reproducing the audio stereophonic components of the composite baseband signal illustrated in FIG. 3.

FIG. 4 illustrates a television receiver constructed for reproducing the stereophonic sound transmissions characterizing the frequency modulated main aural RF carrier developed at the output of transmitting antenna 32. The receiver includes an antenna 110 for intercepting the transmitted RF signals, including both visual and aural components, which signals are coupled to a conventional television tuner 112. The tuner 112 converts the received RF signals to corresponding intermediate frequency (IF) signals which are amplified by an IF amplifier 114. The visual components of the amplified IF signal are coupled to a video detector and therefrom to the remaining video processing circuits of the television receiver while the inter-carrier components of the amplified IF signal are applied to a conventional FM detector stage 116. The FM detector stage 116 functions in a manner well known in the art to demodulate the inter-carrier signal for recreating the composite baseband signal on output conductor 118. The composite baseband signal developed an conductor 118 is applied to one input of a conventional stereo decoder network 120 which receives a second input from a subcarrier regenerator network 222. The $f_H$ pilot signal developed on conductor 118 is coupled to an input of the regenerator network 122 which develops an output in response thereto comprising a regenerated 2$f_H$ subcarrier signal phase locked to the pilot signal. Alternatively, the regenerator circuit 122 may operate in response to the horizontal sync signal developed in the horizontal deflection stage of the receiver, as indicated by dotted line 124, for developing therefrom the 2$f_H$ regenerated subcarrier signal. In either case, the stereo decoder network 120 is responsive to the regenerated 2$f_H$ subcarrier signal and to the main channel and stereo subchannel signals for developing emphasized representations of the left (L) and right (R) stereophonically related audio signals on a pair of output conductors 126 and 128 respectively. These signals are de-emphasized by de-emphasis circuits 130 and 132 to form accurate reproductions of the left (L) and right (R) stereophonically related audio signals which are coupled to separate speaker systems 134 and 136 through amplifiers 135 and 137 for conversion to corresponding audio sounds.

The 2$f_H$ subcarrier regenerator 122 of FIG. 4 may be of the conventional voltage controlled oscillator type but, preferably, comprises a phase-locked filter circuit of the type shown in FIG. 5. The advantage of this circuit is that the loop bandwidth can be made extremely small for rejecting audio components of a signal frequency close to the pilot frequency. The bandwidth of a voltage controlled oscillator phase-locked loop cannot be made this small due to frequency pull-in considerations.

Referring to FIG. 5, the horizontal sync pulses developed on line 124 are converted to a corresponding sine wave signal by a pulse to sine wave converter circuit 141 and coupled therefrom to the signal input of a voltage controlled phase shifter 143. The control input of the voltage controlled phase shifter 143 is derived from the output of a low-pass filter 145 whose cut-off frequency determines the loop bandwidth. The output of the voltage controlled phase shifter 143 is quadrature phase shifted by a phase shift circuit 147 and coupled to the first input of a phase detector 149, the second input of the phase detector 149 comprising the $f_H$ pilot signal developed on line 118. The phase detector 149 develops an output error signal which is coupled through the low-pass filter 145 to the control input of the voltage controlled phase shifter 143 for equalizing the phase of its output with the phase of the $f_H$ pilot signal. The output of the phase shifter 143 accordingly comprises an extremely pure $f_H$ sinewave signal phase locked to the $f_H$ pilot signal and therefore ideally suited for, after being doubled in frequency by a frequency doubler circuit 151, operating the stereo decoder 120.

FIGS. 6A and 6B generally illustrate two alternate embodiments of the stereo decoder circuit shown in FIG. 4. The embodiment of FIG. 6A utilizes time division multiplexing techniques and is preferred in the system of the invention while the embodiment of FIG. 6B utilizes frequency division multiplexing techniques. Referring specifically to FIG. 6A, the $f_H$ pilot signal together with the horizontal sync pulses are coupled to the 2$f_H$ subcarrier regenerator 122, which preferably comprises the phase-locked loop filter circuit of FIG. 5, for synchronizing the operation thereof while the (L−R) sideband signals are coupled to the input of a conventional switching demodulator 140. As is well known in the art, the switching demodulator 140 is operative for effectively multiplying the (L−R) sideband signals by a 2$f_H$ square wave signal represented by the output of a regenerator 122 to form an output signal which may be represented by the expression (L−R)+$\pi$/4(L+R). The latter signal together with the (L+R) main channel signal are applied to the two inputs of a matrix 142 which suitably processes the signals for developing the separate emphasized left (L) and right (R) audio signals on conductors 126 and 128 respectively. A particular advantage is achieved using the foregoing time division demultiplexing technique in that the Fourier expansion of the square wave signal used to operate the switching demodulator 140 includes odd order terms only. As a consequence, the 4$f_H$ term is zero and none of the second language audio signal will therefore appear in the output of the demodulator 140.

FIG. 6B illustrates the frequency division demultiplexing technique. In this case a doubly balanced demodulator 140' is used to develop an (L−R) signal which has no (L+R) component. The (L−R) signal developed at the output of demodulator 140' is suitably combined with the (L+R) main channel signal in a matrix 142' to develop the left (L) and right (R) signals on conductors 126 and 128.

In connection with the above, it is important to note that a conventional monaural television receiver tuned to a program broadcast stereophonically according to the above transmission system will receive in its audio channel the (L+R) audio signal which will provide a perfectly satisfactory signal to listen to. On the other hand, a television receiver including a stereophonic sound reproduction system as shown in FIG. 4 and tuned to receive a monaural broadcast will produce the monaural sound in its (L+R) channel but will not produce the (L−R) audio signal due to the absence of the (L−R) sidebands. In this case, both speakers 134 and 136 will be fed the (L+R) audio signal for reproducing the monaural sound in a perfectly satisfactory manner.

Figure 7:
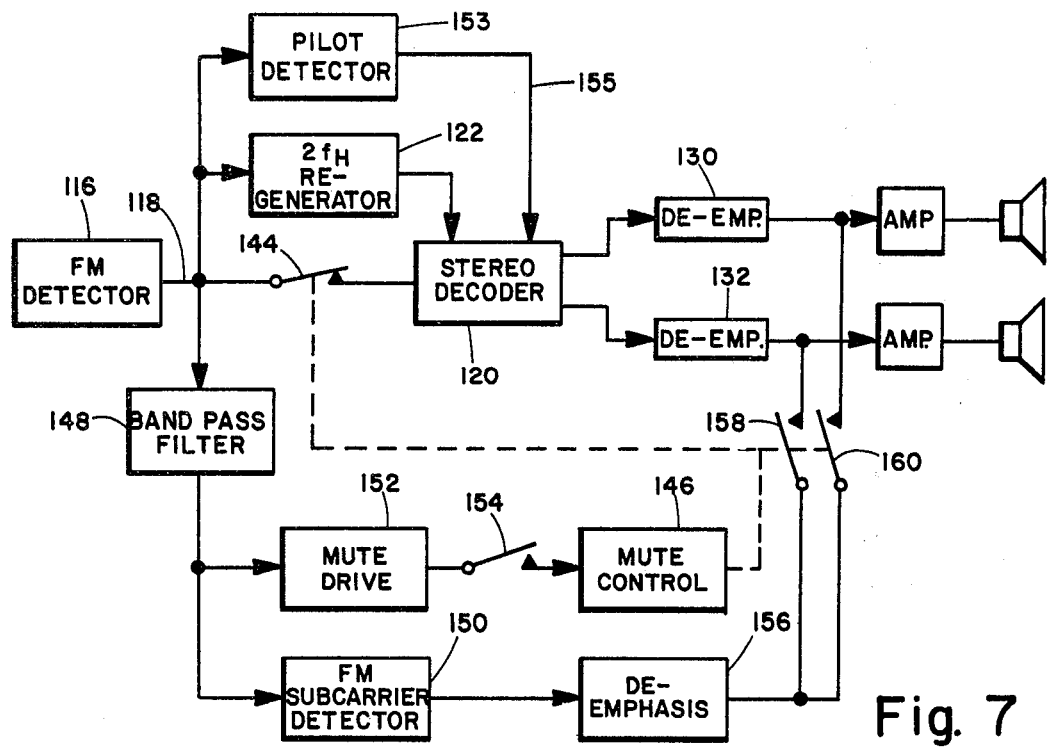
FIG. 7 is a functional block diagram of the portions of a television receiver adapted for selectively reproducing either the stereophonic or the second language audio components of the composite baseband signal shown in FIG. 3.

FIG. 7 illustrates a modification of the circuit of FIG. 4 whereby the viewer of a television receiver may select either the transmitted stereophonic signals or, alternatively, the second language audio signal for reproduction. In this modification, the stereo decoder 120, the $2f_H$ subcarrier regenerator 122 and the de-emphasis circuits 130 and 132 are connected as shown in FIG. 4. The line 118, however, downstream of the take-off point for the $f_H$ pilot signal includes a serially connected switch 144 ganged for operation together with a pair of switches 158 and 160 in response to a mute control circuit 146. The circuit further includes a bandpass filter 148 passing the second language component of the composite baseband signal to an FM subcarrier detector 150. The output of the bandpass filter 148 is also coupled to a mute drive circuit 152 which detects the presence of an FM subcarrier signal. The output of the mute drive circuit 152 is connected to a mute control circuit 146 by a viewer operable selector switch 154. The output of the FM detector 150 is coupled by a de-emphasis circuit 156 to the inputs of switches 158 and 160 whose outputs are connected to the speakers 136 and 134 respectively. While the switches 144, 158 and 160 are schematically illustrated as mechanical in nature, it is preferred that these switches be implemented in an electronic form. Thus, for example, each of the switches 144, 158 and 160 may comprise a transistor switch operable in reponse to suitable output signals from the mute circuit 146.

In operation, when the viewer selector switch 154 is in the position shown in FIG. 7, no drive signal can be supplied to the mute circuit 146 and the switches 144, 158 and 160 assume the positions shown in the Figure. In this condition of the circuit the stereo decoder 120 is operative for energizing the speakers 134 and 136 through the de-emphasis circuits 130 and 132 for producing the separate stereophonic signals as described above. However, when the viewer selector switch 154 is moved to its closed position, the drive circuit 152, in response to the presence of a second language subcarrier signal, energizes mute circuit 146 which causes switch 144 to open and switches 158 and 160 to close. The stereo decoder 120 is thereby decoupled from the FM detector 116 and, at the same time, signals are applied from the FM detector 116 through the bandpass filter 148 and the FM subcarrier detector 150 to the speakers 134 and 136. Since the FM subcarrier detector 150 demodulates the frequency modulated $4f_H$ second language subcarrier, the speakers 134 and 136 will reproduce the second language audio signal. If switch 154 is closed but no second language subcarrier is transmitted, the mute control is inoperative and the stereo signal is automatically reproduced.

The $f_H$ pilot signal is also coupled from line 118 to the input of a pilot detector 153. When the pilot detector 153 detects the presence of an input $f_H$ pilot signal it develops a signal on an output control line 155 conditioning the stereo decoder 120 for suitable demodulating the stereo signals. In the absence of an $f_H$ pilot signal, a control signal is developed on line 155 conditioning decoder 120 for operation in a monaural mode thereby preventing the possibility of decoding noise which might be present in the stereo subchannel.

Figure 8:
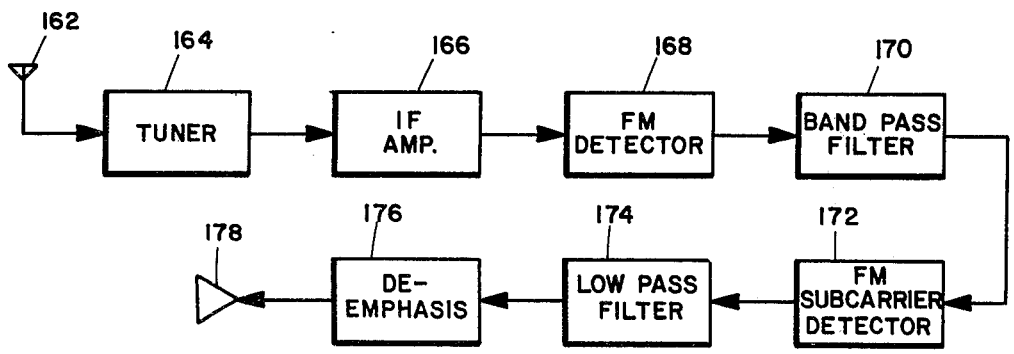
FIG. 8 is a functional block diagram of a receiver adapted for reproducing the ENG component of the composite baseband signal of FIG. 3.

FIG. 8 shows a circuit suitable for reproducing the transmitted ENG signals. It will be appreciated that only a receiver operated by the broadcasting station will include this circuit since the ENG signals are of no interest to the normal viewer. The receiver includes a receiving antenna 162 for intercepting the transmitted main audio RF carrier and for coupling the received signal to the input of a tuner stage 164. The tuner 164 converts the received RF audio carrier to a suitable IF frequency which is amplified by an IF amplifier 166 and coupled to the input of an FM detector 168. The FM detector 168 reconstructs the composite baseband signal at its output and the ENG component, i.e. the frequency modulated $5.5f_H$ subcarrier, is separated therefrom by a bandpass filter 170. The ENG component of the composite baseband signal is then coupled to an FM subcarrier detector 172 which demodulates the $5.5f_H$ frequency modulated subcarrier. The demodulated subcarrier is subsequently coupled through a low-pass filter 174 to remove any frequency components above 3.4 KHz and through a 150 microsecond de-emphasis circuit 176 whereupon the ENG signal is reproduced by a speaker 178.

Figure 9:
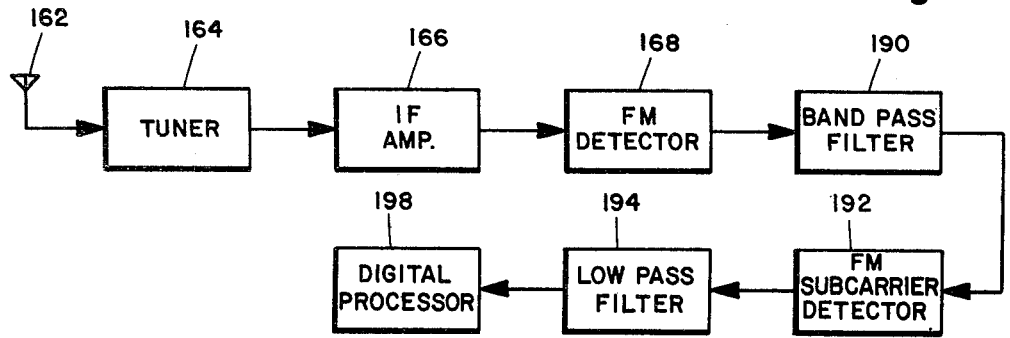
FIG. 9 is a functional block diagram of a receiver adapted for reproducing the telemetry component of the composite baseband signal of FIG. 3.

FIG. 9 illustrates a receiver suitable for reproducing the transmitted telemetry signals. As in the case of the ENG receiver of FIG. 8, only a receiver used for the broadcasting station will include this circuit. The receiver is substantially identical to the ENG receiver of FIG. 7 especially in its front end where the antenna 162, the tuner 164, the IF amplifier 166 and the FM detector 168 are employed. However, a different bandpass filter 190 is used in this case to separate the $6.5f_H$ frequency modulated telemetry subcarrier from the composite baseband signal developed at the output of the FM detector 168. The frequency modulated telemetry subcarrier signal is subsequently demodulated by an FM subcarrier detector 192 and coupled through a low-pass filter 194 for removing any frequency components above 2.0 KHz. The filtered telemetry signal may then be coupled to a suitable digital processing and readout circuit 198.

Figure 10:
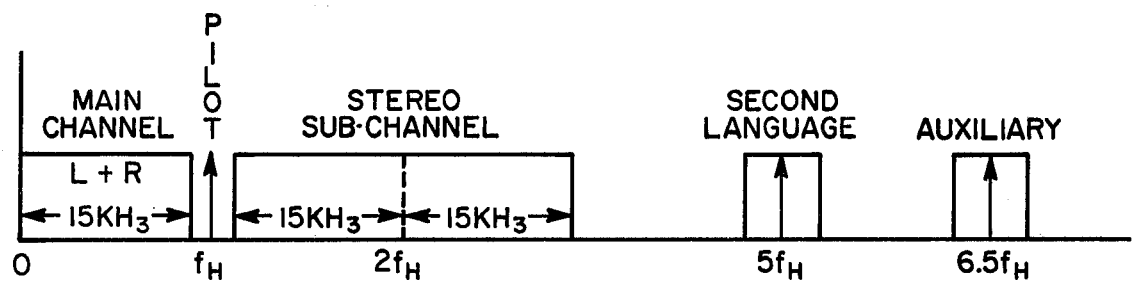
FIG. 10 is a graphic representation of the frequency spectrum of an alternate composite baseband signal according to the invention.

FIG. 10 illustrates the frequency spectrum of an alternate embodiment of the present invention. It has been found that the transmission standard defined by the graph of FIG. 3 adversely affects the audio reproducing characteristics of certain monaural television receivers currently in the field. In particular, it has been found that an objectionable amount of cross-talk may exist between the $4f_H$ subcarrier and the monaural audio channel of these television receivers. This cross-talk may be largely avoided by modifying the transmission standard of FIG. 3 as illustrated in FIG. 10.

Referring to FIG. 10, it will be seen that the frequency spectrum illustrated therein is similar to that shown in FIG. 3 except that the subcarrier for the second language signal has been displaced from $4f_H$ to $5f_H$ and that the channel defined by the $5.5f_H$ frequency modulated subcarrier has been eliminated. This displacement of the second language subcarrier signal to $5f_H$ has been found to largely eliminate the previously described cross-talk problem without at all impacting the stereo transmission scheme of FIG. 3.

Figure 11:
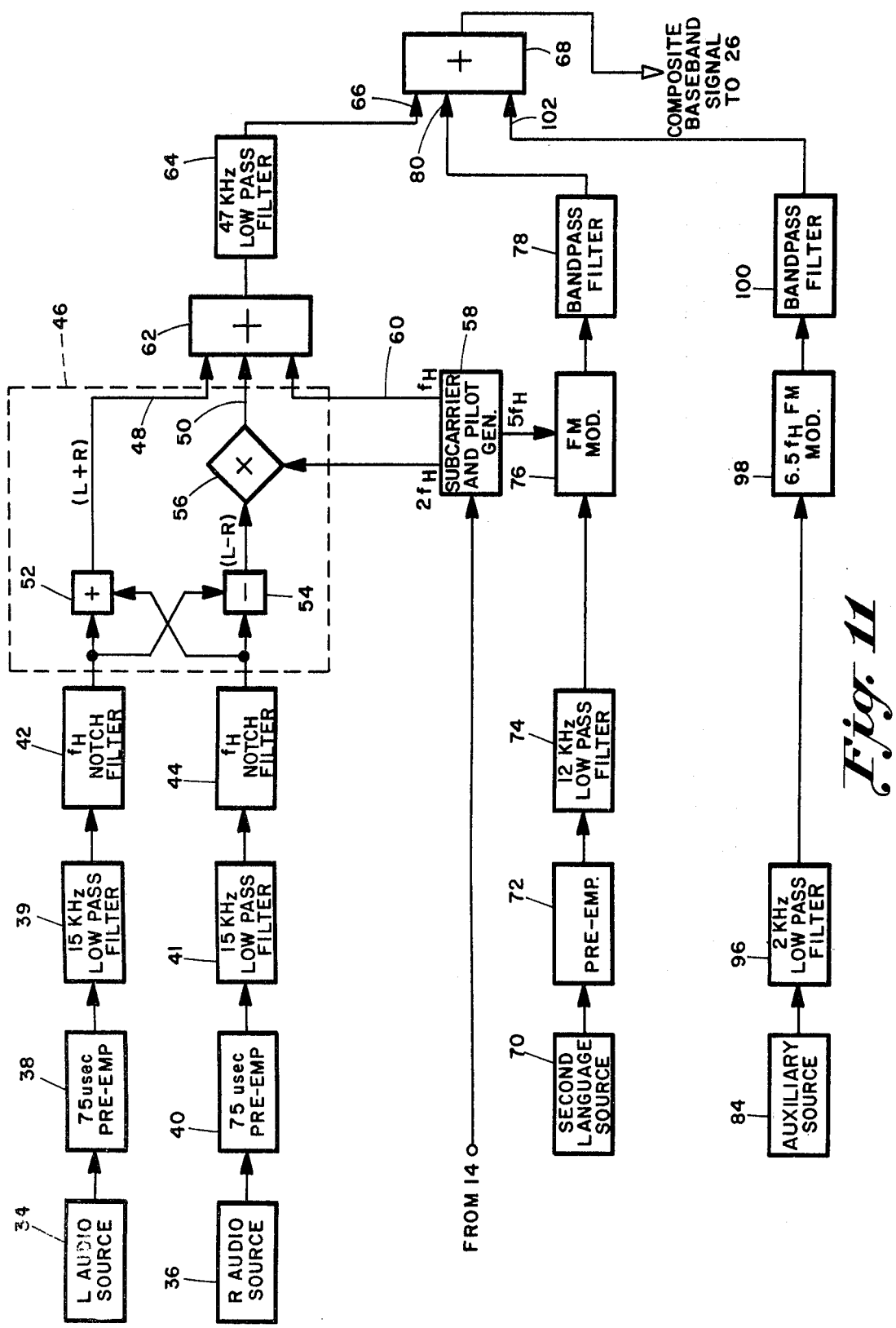
FIG. 11 is a functional block diagram illustrating a composite baseband signal source adapted for producing the composite baseband signal shown in FIG. 10.

FIG. 11 illustrates a composite baseband signal source similar to that of FIG. 2 but configured for producing the baseband signal defined by the frequency spectrum of FIG. 10. Since the circuit of FIG. 11 is configured and operates in a manner nearly identical to the circuit of FIG. 2, for purposes of brevity, a detailed discussion thereof will not be repeated at this point. Suffice it to say that the two circuits are identical except that, in the case of the circuit of FIG. 11, the subcarrier and pilot generator 58 couples a subcarrier signal phase locked to $5f_H$ rather than $4f_H$ to the second input of the FM modulator 76 in the second language channel. In addition, the channel defined by the $5.5f_H$ subcarrier has been eliminated and the channel defined by the $6.5f_H$ subcarrier has been relabled as an auxiliary channel which may be used to transmit either audio or digital type information. When used to transmit digital information, the $6.5f_H$ channel preferably includes the 2 KHz low pass filter 96, the remaining transmission parameters being as shown in Table 1 for the Telemety channel except that the main carrier deviation may be increased to 3.0 KHz. When used to transmit audio signals, filter 96 is preferably removed and replaced by a voice bandwidth filter from the channel, the remaining transmission parameters being as shown in Table 1 for the ENG channel except that the subcarrier and the main carrier deviations may both be reduced to 3.0 KHz.

The television receiver circuits illustrated in FIGS. 4–7 may be used to process the signal produced by the transmitter of FIG. 1 including the audio source shown in FIG. 11, the only difference being that the bandpass filter 148 of FIG. 7 must be configured for coupling the $5f_H$ second language signal to FM subcarrier detector 150 for processing instead of the $4f_H$ subcarrier. The receiver of FIG. 9 may be used to process digital signals transmitted over the $6.5f_H$ channel of FIG. 11 while a similar receiver including an audio output circuit may be used to process audio signals transmitted over the channel.

What has thus been shown is a television audio transmission system, including transmitting and receiving apparatus, which system comprehensively exercises the available auido bandwidth with minimum deleterious effects. In particular, the selection and use of the specific subcarrier signals to produce the composite baseband signal frequency modulating the main audio RF carrier is considered to produce advantageous results heretofore unattained.

While particular embodiments of the invention have been shown and described, it will be obvious to those skilled in the art that changes and modifications may be made without departing from the invention in its broader aspects, and therefor, the aim in the appended claims is to cover all such changes and modifications as fall within the true spirit and scope of the invention.

What is claimed is:

1. In a television signal transmitter of the type having a signal source defining a horizontal scanning line frequency and means for generating an audio transmission signal comprising a main carrier signal frequency modulated by a composite modulation function, the improved apparatus for developing said composite modulation function comprising:

means for developing first and second stereophonically related audio signals;

means for developing a third audio signal;

means for developing first and second subcarrier signals having frequencies equal to two and five times said horizontal scanning line frequency respectively;

means for developing a first modulation function component comprising the sum of said stereophonically related audio signals;

means for developing a second modulation function component comprising a double sideband suppressed carrier signal formed by amplitude modulating said first subcarrier signal in accordance with the difference between said stereophonically related audio signals;

means for developing a third modulation function component comprising said second subcarrier signal frequency modulated in accordance with said third audio signal; and means for combining said first, second and third modulation function components for producing said composite modulation function.

2. In a television signal transmitter of the type having a signal source defining a horizontal scanning line frequency and means for generating an audio transmission signal comprising a main carrier signal frequency modulated by a composite modulation function, the improved apparatus for developing said composite modulation function comprising:

means for developing first and second stereophonically related audio signals;

means for developing a third audio signal;

means for developing first and second subcarrier signals having frequencies equal to two and five times said horizontal scanning line frequency respectively;

means for developing a first modulation function component comprising the sum of said stereophonically related audio signals;

means for developing a second modulation function component comprising a double sideband suppressed carrier signal formed by amplitude modulating said first subcarrier signal in accordance with the difference between said stereophonically related audio signals;

means for developing a third modulation function component comprising said second subcarrier signal frequency modulated in accordance with said third audio signal;

means for developing a fourth modulation function component comprising a pilot signal having a frequency equal to said horizontal scanning line frequency; and means for combining said first, second, third and fourth modulation function components for producing said composite modulation function.

3. In a television signal transmitter of the type having a signal source defining a horizontal scanning line frequency and means for generating an audio transmission signal comprising a main carrier signal frequency modulated by a composite modulation function, the improved apparatus for developing said composite modulation function comprising:

means for developing first and second stereophonically related audio signals;

means for developing a third auido signal;

means for developing first and second subcarrier signals having frequencies phase locked to two and five times said horizontal scanning line frequency respectively;

means for developing a first modulation function component comprising the sum of said stereophonically related audio signals;

means for developing a second modulation function component comprising a double sideband suppressed carrier signal formed by amplitude modulating said first subcarrier signal in accordance with the difference between said stereophonically related audio signals;

means for developing a third modulation function component comprising said second subcarrier signal frequency modulated in accordance with said third audio signal;

means for developing a fourth modulation function component comprising a pilot signal having a frequency phase locked to said horizontal scanning line frequency; and means for combining said first, second, third and fourth modulation function components for producing said composite modulation function.

4. The improved apparatus according to claim 3 including means for developing a first information signal, means for developing a third subcarrier signal having a frequency equal to about 6.5 times said horizontal scanning line frequency, means for developing a fifth modulation function component comprising said third subcarrier signal frequency modulated in accordance with said first information signal and means for combining said first, second, third, fourth and fifth modulation function components for producing said composite modulation function.

5. In a television signal transmitter of the type having a video signal transmitter including means developing a horizontal sync signal defining a horizontal scanning line frequency and an aural signal transmitter including means for frequency modulating a main carrier signal in accordance with a composite modulation function, the improved apparatus for developing said composite modulation function comprising:

means for developing first and second stereophonically related audio signals;

means for developing a third audio signal;

means for developing a first information signal;

means responsive to said horizontal sync signal for generating a pilot signal and first and second subcarrier signals having frequencies phase locked to the first, second and fifth harmonics of said horizontal scanning line frequency respectively;

means for developing a third subcarrier signal having a frequency equal to about 6.5 times said horizontal scanning line frequency;

means for developing a first modulation function component comprising the sum of said stereophonically related audio signals;

means for developing a second modulation function component comprising a double sideband suppressed carrier signal formed by amplitude modulating said first subcarrier signal in accordance with the difference between said stereophonically related audio signals;

means for developing a third modulation function component comprising said second subcarrier signal frequency modulated in accordance with said third audio signal;

means for developing a fourth modulation function component comprising said third subcarrier signal frequency modulated in accordance with said first information signal and;

means for combining said pilot signal and said first, second, third, and fourth modulation function components for producing said composite modulation function.

6. A television signal transmitter comprising:

a video signal transmitter including means developing a horizontal sync signal defining a horizontal scanning line frequency;

means for generating an aural main carrier signal;

means for generating first and second stereophonically related audio signals;

means for generating a third audio signal;

means responsive to said horizontal sync signal for generating first and second subcarrier signals having frequencies phase locked to two and five times said horizontal scanning line frequency and for developing a pilot signal having a frequency phase locked to said horizontal scanning line frequency;

means for developing a first modulation function component comprising the sum of said stereophonically related audio signals;

means for developing a second modulation function component comprising a double sideband suppressed carrier signal formed by amplitude modulating said first subcarrier signal in accordance with the difference between said stereophonically related audio signals;

means for developing a third modulation function component comprising said second subcarrier signal frequency modulated in accordance with said third audio signal;

means for developing a composite modulation function comprising said pilot signal and said first, second and third modulation function components; and means for developing an audio transmission signal comprising said main carrier signal frequency modulated in accordance with said composite modulation function.

7. The signal transmitter according to claim 6 including:

means for developing a first information signal;

means for generating a third subcarrier signal having frequency equal to about 6.5 times said horizontal scanning line frequency;

means for developing a fourth modulation function component comprising said third subcarrier signal frequency modulated in accordance with said first information signal and;

means for developing a composite modulation function comprising said pilot signal and said first, second, third, and fourth modulation function components.

8. A receiver for a television signal transmission system characterized by a transmitted aural signal comprising a main carrier signal frequency modulated in accordance with a composite modulation function having a first component comprising the sum of first and second stereophonically related audio signals, a second component comprising a double sideband suppressed carrier signal formed by amplitude modulating a first subcarrier having a frequency $2f_H$ in accordance with the difference between said stereophonically related audio signals, a third component comprising a second subcarrier having a frequency $5f_H$ frequency modulated in accordance with a third audio signal, and a fourth component comprising a pilot signal having a frequency $f_H$, where $f_H$ is the horizontal scanning line frequency associated with the horizontal sync signal of a transmitted television signal, said receiver comprising:

input means responsive to a transmitted television signal for deriving said composite modulation function;

means for developing a first modulation function component comprising the sum of said stereophonically related audio signals;

means for developing a second modulation function component comprising a double sideband suppressed carrier signal formed by amplitude modulating said first subcarrier signal in accordance with the difference between said stereophonically related audio signals;

means for developing a third modulation function component comprising said second subcarrier signal frequency modulated in accordance with said third audio signal;

means for combining said pilot signal and said first, second and third modulation function components for producing a composite modulation function;

means for generating an RF aural carrier signal;

means for frequency modulating said aural carrier with said composite modulation function;

means for transmitting said modulated aural carrier signal; receiver means comprising means for receiving said transmitted aural carrier signal and including input means for deriving said composite modulation function therefrom;

means for regenerating said first subcarrier signal;

stereophonic decoding means responsive to said derived composite modulation function and to said regenerated subcarrier signal for developing a pair of output audio signals corresponding to said first and second stereophonically related audio signals; and an FM detector responsive to said derived composite modulation function for developing a third audio output signal corresponding to said third audio signal.

15. The transmission system according to claim 14 wherein said means for regenerating comprises means responsive to said pilot signal and to said horizontal sync signal for regenerating said first subcarrier signal in a form phase and frequency locked to the second harmonic of said pilot signal.

16. In a television signal transmitter of the type having a signal source defining a horizontal scanning line frequency and means for generating an audio transmission signal comprising a main carrier signal frequency modulated by a composite modulation function, the improved method for developing said composite modulation function comprising:

generating first and second stereophonically related audio signals;

generating a third audio signal;

generating first and second subcarrier signals having frequencies equal to two and five times said horizontal scanning line frequency respectively;

generating a first modulation function component by forming the sum of said sterephonically related audio signals;

generating a second modulation function component by amplitude modulating said first subcarrier signal in accordance with the difference between said stereophonically related audio signals for forming a double sideband suppressed carrier signal;

generating a third modulation function component by frequency modulating said second subcarrier signal in accordance with said third audio signal; and combining said first, second and third modulation function components for producing said composite modulation function.

17. In a television signal transmitter of the type having a signal source defining a horizontal scanning line frequency and means for generating an audio transmission signal comprising a main carrier signal frequency modulated by a composite modulation function, the improved method for developing said composite modulation function comprising:

generating first and second stereophonically related audio signals;

generating a third audio signal;

generating first and second subcarrier signals having frequencies equal to two and five times said horizontal scanning line frequency respectively;

generating a first modulation function component by forming the sum of said stereophonically related audio signals;

generating a second modulation function component by amplitude modulating said first subcarrier signal in accordance with the difference between said stereophonically related audio signals for forming a double sideband suppressed carrier signal;

generating a third modulation function component by frequency modulating said second subcarrier signal in accordance with said third audio signal;

generating a fourth modulation function component comprising a pilot signal having a frequency equal to said horizontal scanning line frequency; and combining said first, second, third and fourth modulation function components for producing said composite modulation function.

18. The method of developing a composite modulation function according to claim 17 wherein said pilot signal, said first subcarrier signal and second subcarrier signal are phase locked to the first, second and fourth harmonics respectively of said horizontal scanning line frequency.

19. In a television signal transmitter of the type having a video signal transmitter including means developing a horizontal sync signal defining a horizontal scanning line frequency and an aural signal transmitter including means for frequency modulating a main carrier signal in accordance with a composite modulation function, the improved method of developing said composite modulation function comprising:

generating first and second stereophonically related audio signals;

generating a third audio signal;

generating first and second information signals;

generating a pilot signal and first and second subcarrier signals having frequencies equal to one, two and five times said horizontal scanning frequency respectively;

generating a third subcarrier signal having a frequency approximately equal to 6.5 times said horizontal scanning line frequency;

generating a first modulation function component comprising the sum of said stereophonically related audio signals;

generating a second modulation function component comprising a double sideband suppressed carrier signal formed by amplitude modulating said first subcarrier signal in accordance with the difference between said stereophonically related audio signals;

generating a third modulation function component comprising said second subcarrier signal frequency modulated in accordance with said third audio signal;

means responsive to said derived composite modulation function for regenerating said first subcarrier signal in a form phase and frequency locked to the second harmonic of said pilot signal;

stereophonic decoding means responsive to said derived composite modulation function and to said regenerated subcarrier signal for developing a pair of output audio signals corresponding to said first and second stereophonically related audio signals;

means responsive to said derived composite modulation function for producing said third component; and FM detector means responsive to said produced third component for developing a third audio output signal corresponding to said third audio signal.

9. A receiver for a television signal transmission system characterized by a transmitted aural signal comprising a main carrier signal frequency modulated in accordance with a composite modulation function having a first component comprising the sum of first and second stereophonically related audio signals, a second component comprising a double sideband suppressed carrier signal formed by amplitude modulating a first subcarrier having a frequency $2f_H$ in accordance with the difference between said stereophonically related audio signals and a third component comprising a second subcarrier having a frequency $5f_H$ frequency modulated in accordance with a third audio signal, where $f_H$ is the horizontal scanning line frequency associated with the horizontal sync signal of a transmitted television signal, said receiver comprising:

input means responsive to a transmitted television signal for developing a first signal corresponding to said composite modulation function;

a bandpass filter having a center frequency of $5f_H$ and responsive to said first signal for developing a sound signal corresponding to said third component of said composite modulation function;

means for regenerating said first subcarrier signal;

stereophonic decoding means responsive to said first signal and to said regenerated subcarrier for developing a pair of output audio signals corresponding to said first and second stereophonically related audio signals; and an FM detector responsive to said second signal for developing a third audio output signal corresponding to said third audio signal.

10. The receiver according to claim 9 wherein said composite modulation function includes a fourth component comprising a pilot signal having a frequency $f_H$, said means for regenerating being responsive to said pilot signal and to said horizontal sync signal for phase and frequency locking said regenerated first subcarrier signal to the second harmonic of said pilot signal.

11. The receiver according to claim 10 including first and second speaker means and switching means selectively operable for coupling said first and second stereophonically related audio signals, respectively, to said first and second speaker means or for coupling said third audio signal to said first and second speaker means.

12. A receiver for a television signal transmission system characterized by a transmitted aural signal comprising a main carrier signal frequency modulated in accordance with a composite modulation function having a first component comprising the sum of first and second stereophonically related audio signals, a second component comprising a double sideband suppressed carrier signal formed by amplitude modulating a first subcarrier having a frequency $2f_H$ in accordance with the difference between said stereophonically related audio signals, a third component comprising a second subcarrier having a frequency $5f_H$ frequency modulated in accordance with a third audio signal and a fourth component comprising a third subcarrier having a frequency approximately $6.5f_H$ frequency modulated in accordance with a first information signal where $f_H$ is the horizontal scanning line frequency defined by the horizontal sync signal of a transmitted television signal, said receiver comprising:

input means responsive to a transmitted television signal for developing a baseband signal corresponding to said composite modulation function; and decoding means responsive to said baseband signal for developing therefrom said first and second stereophonically related audio signals, said third audio signal and said first information signal.

13. A receiver for a television signal transmission system characterized by a transmitted aural signal comprising a main carrier signal frequency modulated in accordance with a composite modulation function having a first component comprising the sum of first and second stereophonically related audio signals, a second component comprising a double sideband suppressed carrier signal formed by amplitude modulating a first subcarrier having a frequency $2f_H$ in accordance with the difference between said stereophonically related audio signals, a third component comprising a second subcarrier having a frequency $5f_H$ frequency modulated in accordance with a third audio signal and a fourth component comprising a third subcarrier having a frequency approximately $6.5f_H$ frequency modulated in accordance with a first information signal, and a fifth component comprising a pilot signal having a frequency $f_H$, where $f_H$ is the horizontal scanning line frequency defined by the horizontal sync signal of a transmitted television signal, said receiver comprising;

input means responsive to a transmitted television signal for developing a baseband signal corresponding to said composite modulation function;

phase locked filter means responsive to said pilot signal and to said horizontal sync signal for regenerating said first subcarrier signal in a form phase and frequency locked to the second harmonic of said pilot signal; and decoding means responsive to said baseband signal and to said regenerated subcarrier signal for developing therefrom said first and second stereophonically related audio signals, said third audio signal and said first information signal.

14. A television signal audio transmission system comprising: transmission means including a signal source defining a horizontal scanning line frequency $f_H$ corresponding to the frequency of the horizontal sync signal of the video component of a transmitted television signal;

means for developing first and second stereophonically related audio signals;

means for developing a third audio signal;

means for developing first and second subcarrier signals having frequencies equal to $2f_H$ and $5f_H$ respectively;

means for developing a pilot signal having a frequency equal to $f_H$;

generating a fourth modulation function component comprising said third subcarrier signal frequency modulated in accordance with said first information signal; and combining said pilot signal and said first, second, third, and fourth modulation function components for producing said composite modulation function.

20. The method of developing a composite modulation function according to claim 19 including the step of phase locking said pilot signal and said first and second subcarrier signals to the first, second and fifth harmonics respectively of said horizontal sync signal.

21. The method of implementing a television signal audio transmission system comprising:

generating first and second stereophonically related audio signals;

generating a third audio signal;

generating first and second subcarrier signals having frequencies equal to $2f_H$ and $5f_H$ respectively, where $f_H$ is equal to the frequency of the horizontal sync signal of the video component of a transmitted television signal;

generating a pilot signal having a frequency equal to $f_H$;

generating first modulation function component comprising the sum of said stereophonically related audio signals;

generating a second modulation function component comprising a double sideband suppressed carrier signal formed by amplitude modulating said first subcarrier signal in accordance with the difference between said stereophonically related audio signals;

generating a third modulation function component comprising said second subcarrier signal frequency modulated in accordance with said third audio signal;

combining said pilot signal and said first, second and third modulation function components for producing a composite modulation function;

generating an RF aural carrier signal;

frequency modulating said aural carrier with said composite modulation function;

transmitting said modulated aural carrier signal;

receiving said transmitted aural carrier signal and deriving said composite modulation function therefrom;

regenerating said first subcarrier signal;

using said regenerating subcarrier signal for decoding said composite modulation function for developing a pair of output audio signals corresponding to said first and second stereophonically related audio signal; and detecting said derived composite modulation function for developing a third audio output signal corresponding to said third audio signal.

22. The method according to claim 21 wherein said pilot signal and said first and second subcarrier signals are phase locked to the first, second and fifth harmonics respectively of said horizontal sync signal.

* * * * *